United States Patent [19]

Schirmer

[11] 3,756,724
[45] Sept. 4, 1973

[54] DEVICE FOR MEASURING CAMBER AND CASTER OF VEHICLE WHEELS

[75] Inventor: Günter Schirmer, Leinfelden, Germany

[73] Assignee: Robert Bosch GmbH, Stuttgart, Germany

[22] Filed: Oct. 28, 1970

[21] Appl. No.: 84,798

Related U.S. Application Data

[63] Continuation-in-part of Ser. No. 47,034, June 17, 1970, Pat. No. 3,630,623.

[30] Foreign Application Priority Data

June 1, 1969 Germany................... P 19 30 737.0

[52] U.S. Cl. ............................................. 356/155
[51] Int. Cl. ......................................... G01b 11/26
[58] Field of Search.................... 356/152, 155, 153, 356/154; 250/202

[56] References Cited
UNITED STATES PATENTS

| | | | |
|---|---|---|---|
| 3,316,800 | 5/1967 | Kibler ................................ | 356/152 |
| 3,532,892 | 10/1970 | Murphy ............................. | 356/152 |
| 3,533,699 | 10/1970 | Hopkins et al...................... | 356/155 |
| 2,410,339 | 10/1946 | Creagmile.......................... | 356/155 |

Primary Examiner—William L. Sikes
Attorney—Michael S. Striker

[57] ABSTRACT

A projector pivotal about an inclined axis casts upon a reflector mounted on a wheel a pattern, in the form of cross hairs, which reflector returns the image to a screen having therein two photo-diodes, the angular movement of the projector required to cause a cross hair to fall across the respective photo-diode is a measure of the caster or camber of the wheel. The projector is connected to the tab of a resistor, the voltage at the tab being indicative of the pivotal movement of the projector.

11 Claims, 8 Drawing Figures

INVENTOR
Günter SCHIRMER

DEVICE FOR MEASURING CAMBER AND CASTER OF VEHICLE WHEELS

This application is a Continuation-in-part of patent application Ser. No. 47,034, filed June 17, 1970, and issued Dec. 28, 1971 as U.S. Pat. No. 3,630,623.

BACKGROUND OF THE INVENTION

The invention relates to an arrangement for measuring the angular deviation of at least one wheel means from a predetermined plane relative to the body of a vehicle.

SUMMARY OF THE INVENTION

An object of the invention is an improved arrangement of the aforesaid kind. The invention consists essentially of projector means adapted to project an image of measuring indicia towards the wheel means, reflector means, mounted on the wheel means to assume the angular deviation thereof, and mounted in the path of the projected image to reflect the image; screen means mounted in the path of the reflected image whereby an optical path is defined between the projector means and the screen means, at least one control indicium arranged on the screen means in such a position that the image of the reflected indicia is located on the screen means in a predetermined position relative to the control indicium when the wheel means is undeviated from the predetermined plane; means mounting the projector means turnably about an inclined axis to enable changing of the position of the image on the screen means until the image is in the predetermined position relative to the control indicium of the screen means, whereby the extent of turning of the projector means is an indication of the angular deviation of the position of the wheel means from the predetermined plane; and an angle measuring circuit for providing, in dependence on the extent of turning of the projector means about the inclined axis, an electrical signal indicating the angular deviation of the wheel means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
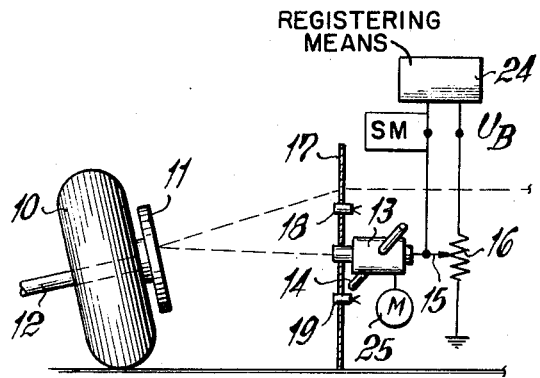
FIG. 1a is a schematic side view showing the projector in its first end position.
Figure 1B:
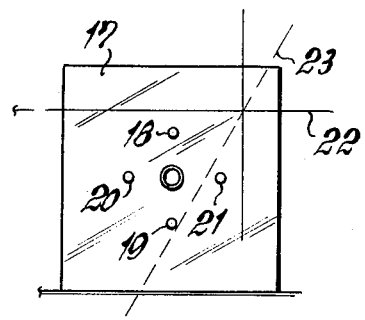
FIG. 1b is a front view of the projection screen.

With reference to FIG. 1, there is mounted on the wheel 10 of a motor vehicle a mirror or reflector 11, which is normal to the axle 12 of the wheel 10. An optical projector unit 13, which is mounted free to turn about an inclined axle 14, is positioned opposite the mirror 11. The projector 13 is connected to the tap 15 of a resistor 16 that is connected to a source of voltage $U_B$. Resistor 16 and wiper 15 together form transducer means for furnishing an electrical signal indicative of the angular orientation of the projector unit 13. The voltage on the tap 15 is indicative of the angular position of the projector 13. A picture screen 17 in the plane of which is arranged a light-detecting unit comprising photoelements, here; 18, 19, 20 and 21, is positioned in front of the projector. Photo-elements 18 and 19 constitute a first photoresponsive component of the light-detecting unit, and photoelements 20 and 21 constitute a second photoresponsive component of the light-detecting unit. FIG. 1b shows the screen 17 as seen from the front, there being projected on the screen an image of an indicium having the form of two perpendicular lines or; cross hairs 22 that are bright if the rest of the projected image is dark and are dark if the rest of the projected image is bright. When the projector 13 is turned about the inclined axle 14, the cross hairs 22 are moved along the broken line 23. Axle 14 constitutes mounting means for mounting the projector unit tiltable with respect to the light-detecting unit.

An arrangement identical to the one just described is also positioned on the other side of the vehicle, the optical axes of the two projectors coinciding when the projectors are in their normal, unturned, position.

Figure 2A:
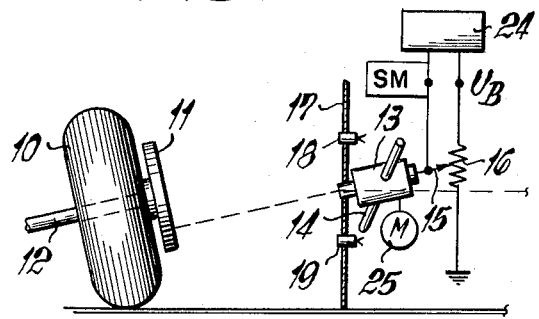
FIG. 2a is a side view of the projector when measuring camber.
Figure 2B:
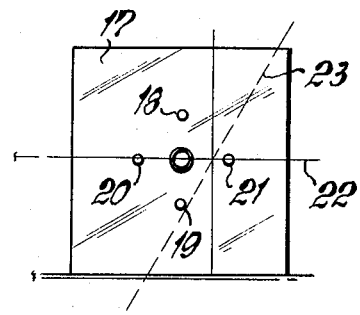
FIG. 2b is a front view of the screen when camber is being measured.
Figure 3A:
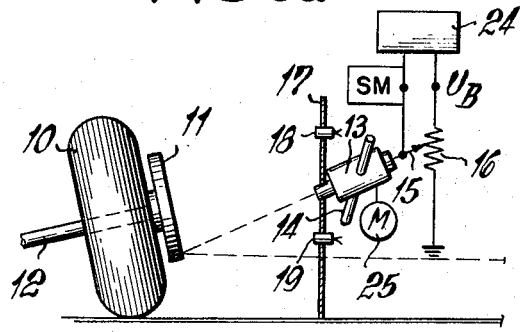
FIG. 3a is a side view of the projector when measuring caster.
Figure 3B:
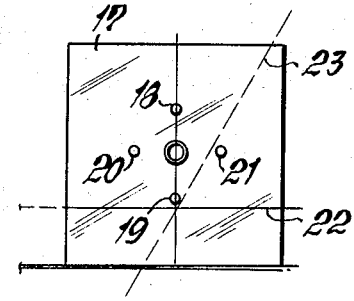
FIG. 3b is a front view of the screen showing the position of the cross hairs when measuring caster

The projector 13, which is shown in FIG. 1a in its first end position, is turned about the inclined axle 14 when measuring the angular position of the wheel 10, the intersection of the cross hairs 22 moving along the broken line 23. Beginning from its first end position, shown in FIG. 1a, the projector is turned until, as shown in FIG. 2a, the horizontal cross hair falls across the two photo-diodes 20 and 21 that lie along a horizontal line. When this occurs, the voltage on the tap 15 is conducted to a switching means circuit, not shown, which in turn conducts the voltage to a computer or registering means 24, which stores and records i.e. registers the voltage. This voltage is clearly indicative of the camber. The switching means SM is a conventional and angular orientation of the projector unit and thus indirectly of the gate which is so designed that if both of the photo-diodes 18 and 19 or 20 and 21 lie in the path of the corresponding cross hair, the voltage on the tap 15 is conducted to the registering means 24, whereas if only one, or no, photo-diode lies in the path of the corresponding cross hair, the tap 15 is not connected to the input of the registering means 24. The projector 13 is turned further until the vertical cross hair lies across the pair of photo-diodes 18 and 19, this position of the projector corresponding to the caster. The voltage on the tap 15, which is indicative of the caster, is also conducted to the computer 24. The projector positioning motor 25 can return the projector to its first end position, or continue to turn the projector in the same direction until it reaches its second end position. These movements of the projector by the motor 24 can be controlled by limit switches. Conversely, once the camber and caster have been measured, a signal can be generated that shuts off the motor 25.

The two pairs of photo-diodes 18, 19 and 20, 21 respectively lie along vertical and horizontal lines that intersect at a line extended from the optical axis of the projector, when the latter is in its normal, unturned position.

Figure 4A:
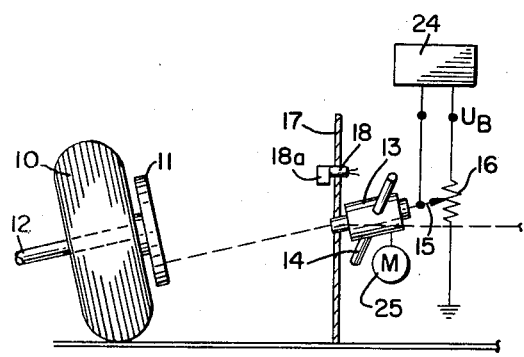
FIG. 4a is a side view of another projector according to the invention.
Figure 4B:
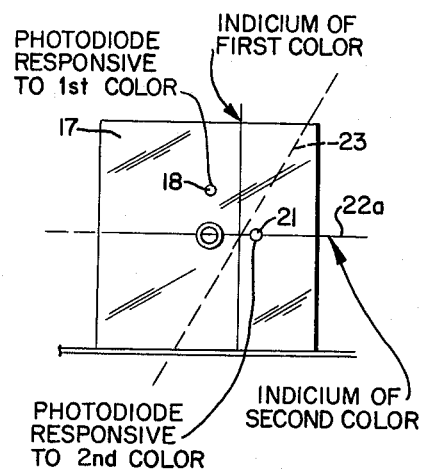
FIG. 4b is a front view of the screen showing the differently colored cross-hairs.

The arrangement of the invention can be made still simpler by providing two photo-diodes instead of four, each photo-diode lying along a respective horizontal and vertical line, these two lines intersecting at a line extended from the aforesaid optical axis of the projector. This possibility is shown in FIGS. 4a and 4b. The two hairs of the cross hairs must be different colors, the two photo-diodes being provided with suitable color filters 18a and 2a, so that each photo-diode produces a signal only when the corresponding cross hair lies across it. When a cross hair lies across the corresponding photo-diode (for example, the vertical cross hair across that photo-diode located along the vertical line) a switch means S.M., such as a gate, connects the voltage of the tab 15 to the input of the registering means 24. In the illustrated embodiments, screen 17 itself constitutes means for limiting the range of pivoting movement of projector 13.

In a still further embodiment of the invention, there are provided two photo-diodes, each photo-diode having a light sensitive surface extending in the direction of the line (horizontal or vertical) along which the respective photo-diode is located. In this embodiment, that photo-diode located along the vertical line produces a signal when the vertical cross hair lies across it, and that photo-diode located along the horizontal line produces a signal when the horizontal cross hair lies across it.

It will be understood that each of the elements described above, or two or more together, may also find a useful application in other types of constructions differing from the types described above.

While the invention has been illustrated and described as embodied in a device for measuring camber and caster of the vehicle wheels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for measuring the angular deviation of an object, particularly a vehicle wheel, from a predetermined orientation comprising, in combination, a reflector mounted on said object in such a manner as to assume the orientation of said object; a projector unit for projecting an image of an indicium towards said reflector; a light-detecting unit for receiving from said reflector the reflection of said image of an indicium; mounting means mounting one of said units tiltable with respect to the other of said units through a range of tilting movement including, for each angular deviation of said object, a respective tilted orientation for which said image of said indicium falls upon said light-detecting unit; registering means for automatically registering the angular orientation of said one of said units when said image of said indicium falls upon said light-detecting unit.

2. An arrangement as defined in claim 1, wherein said mounting means comprises means mounting said projector unit for pivotable movement about a pivot axis inclined with respect to the horizontal.

3. An arrangement as defined in claim 1, wherein said projector unit comprises means for projecting an image of an indicium having the form of two intersecting lines.

4. An arrangement as defined in claim 2, wherein said light-detecting unit comprises a first photoresponsive component responsive to a first range of light wavelengths and a second photoresponsive component responsive to a second different range of light wavelengths, and wherein said first and second photoresponsive components are located in a common vertical plane, and wherein said projector unit has an optical axis intersecting said plane, and further wherein said first photoresponsive component is located on a vertical line intersecting said optical axis and wherein said second photoresponsive component is located on a horizontal line intersecting said optical axis, and wherein said projector unit comprises means for projecting an image of an indicium having the form of two intersecting lines of different colors respectively falling in said first and second ranges of light wavelengths.

5. An arrangement as defined in claim 4, wherein said first and second photoresponsive components each include a respective color filter.

6. An arrangement as defined in claim 2, wherein said projector unit comprises means for projecting an image of an indicium having the form of two intersecting perpendicular lines, and wherein said light-detecting unit comprises first and second photoresponsive components located in a common vertical plane, and wherein said projector unit has an optical axis intersecting said plane, and further wherein said first photoresponsive component is located on a vertical line intersecting said optical axis and has an overall effective length along said vertical line greater than the effective width of said first component transverse to said vertical line, and wherein said second photoresponsive component is located on a horizontal line intersecting said optical axis and has an overall effective length along said horizontal line greater than the effective width of said second component transverse to said horizontal line.

7. An arrangement as defined in claim 2, wherein said registering means is electrical, and further including transducer means for generating an electrical signal indicative of the angular orientation of said projector unit, and switch means operative for transmitting said signal to said registering means when said image of said indicium falls upon said light-detecting unit.

8. An arrangement as defined in claim 6, wherein said first photoresponsive component comprises two discrete photoelements located on said vertical line on opposite sides of said optical axis, and wherein said second photoresponsive component comprises two discrete photoelements located on said horizontal line on opposite sides of said optical axis.

9. An arrangement as defined in claim 8, wherein said registering means is electrical and further including transducer means for generating an electrical signal indicative of the angular orientation of said projector unit, and switch means connected between said registering means and said transducer means and operative for transmitting said signal to said registering means in response to the falling of one of said perpendicular lines upon the two photoelements of the respective one of said photoresponsive components.

10. An arrangement as defined in claim 2, and further including means for limiting the range of pivoting movement of said projector unit about said pivot axis.

11. An arrangement as defined in claim 2, and further including motor means for moving said projector unit about said pivot axis.

* * * * *